United States Patent [19] [11] 3,777,501
Sharp et al. [45] Dec. 11, 1973

[54] CAPILLARY INSULATION

[75] Inventors: Richard A. Sharp, Lakewood; John P. Gille; Jay L. McGrew, both of Littleton, all of Colo.

[73] Assignee: Martin Marietta Corporation, New York, N.Y.

[22] Filed: Mar. 12, 1971

[21] Appl. No.: 123,794

[52] U.S. Cl. .............. 62/45, 62/55, 220/9 LG, 285/47, 285/DIG. 5
[51] Int. Cl. ............................................. F17c 1/12
[58] Field of Search ............... 62/45, 55; 220/9 A, 220/9 LG; 285/DIG. 5, 47; 138/114, 148, 149

[56] References Cited
UNITED STATES PATENTS

| 3,068,026 | 12/1962 | McKamey | 285/DIG. 5 |
| 3,397,720 | 8/1968 | Jones | 285/47 X |
| 3,668,880 | 6/1972 | Gille | 62/45 |
| 3,675,809 | 7/1972 | McGrew et al. | 220/9 LG |
| 2,676,773 | 4/1954 | Sanz et al. | 220/9 A X |
| 2,937,780 | 5/1960 | Beckwith | 220/9 LG |
| 3,019,937 | 2/1962 | Morrison | 220/65 |
| 3,365,897 | 1/1968 | Middleton et al. | 62/45 |
| 3,395,754 | 8/1968 | French | 165/185 |

Primary Examiner—Meyer Perlin
Assistant Examiner—Ronald C. Capossela
Attorney—Phillip L. DeArment and Gay Chin

[57] ABSTRACT

Capillary insulation for transferring low temperature liquids is provided in which a cellular structure is in the form of a cylinder, and defines a plurality of radially extending discrete cells enclosed by a capillary cover with capillary openings communicating with each cell. The cylindrical capillary insulation may be used as a hose or conduit for the transfer of low temperature liquids or as either external or internal insulation for tubes or pipes. A method of manufacturing the cylindrical capillary insulation is disclosed, together with a specific insulated joint construction for interconnecting sections of the insulation.

13 Claims, 9 Drawing Figures

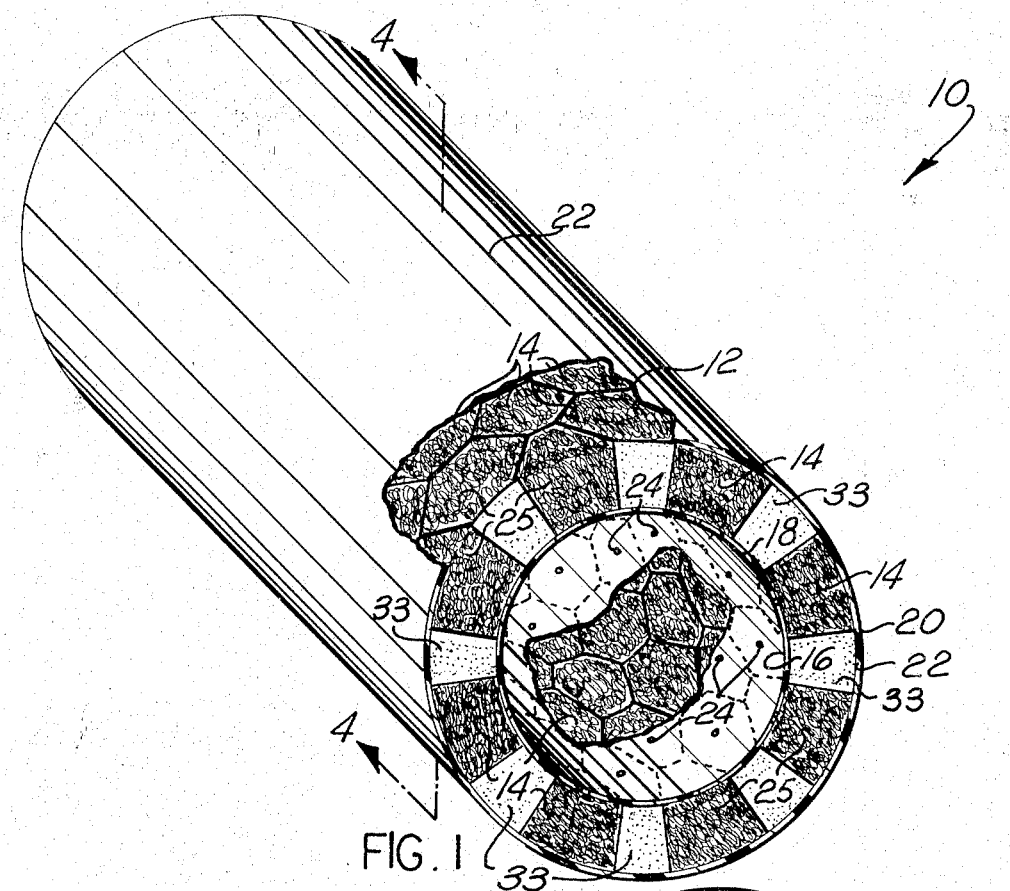
FIG. 1
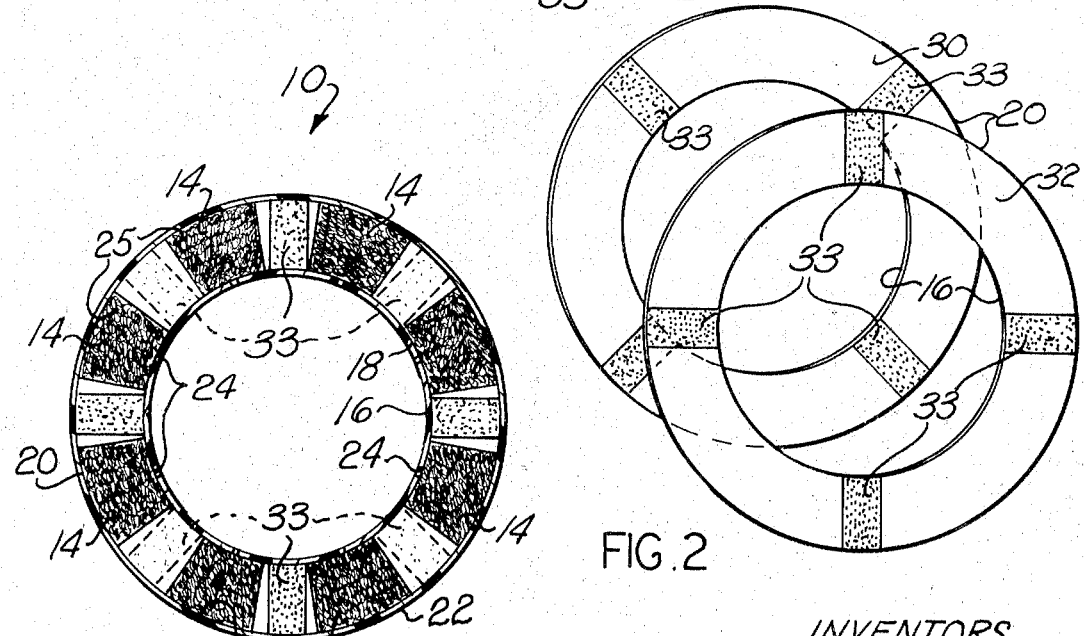
FIG. 2
FIG. 4
INVENTORS
RICHARD A. SHARP
JOHN P. GILLE
JAY L. McGREW
BY Yount and Tarolli
ATTORNEYS

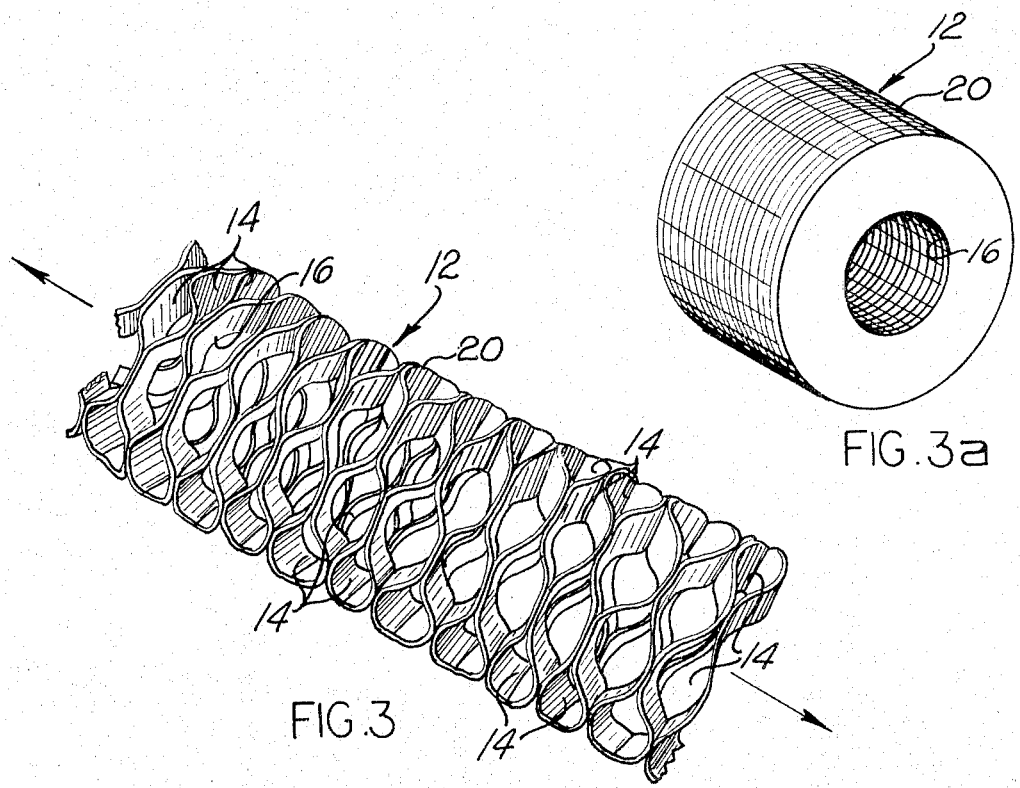
FIG.3a
FIG.3
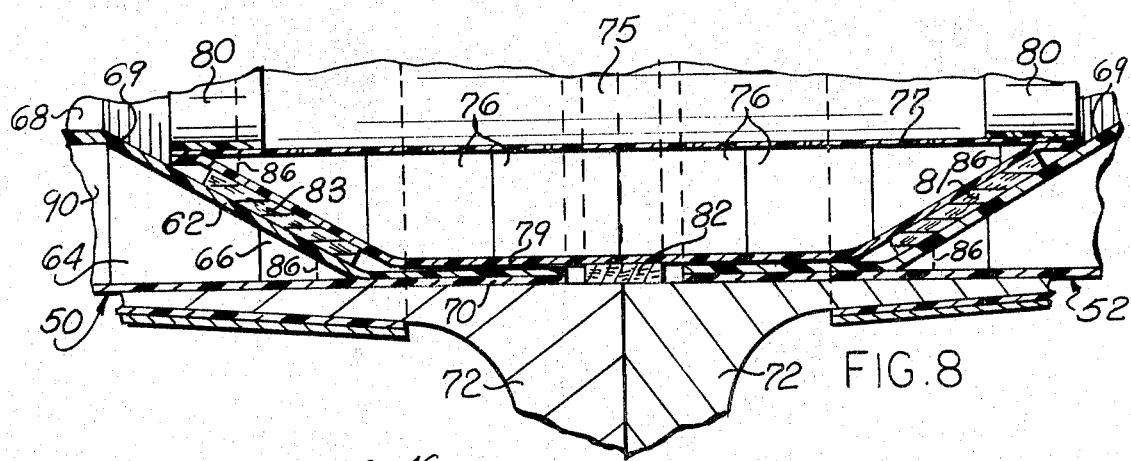
FIG.8
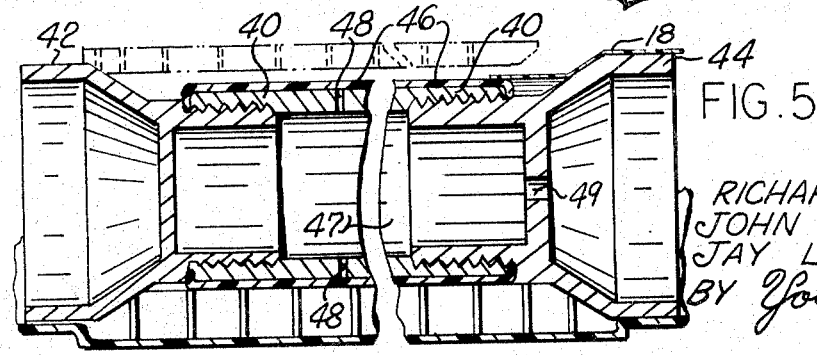
FIG.5
INVENTORS
RICHARD A. SHARP
JOHN P. GILLE
JAY L. McGREW
BY Yount and Tarolli
ATTORNEYS INVENTORS
RICHARD A. SHARP
JOHN P. GILLE
JAY L. McGREW
BY Yount and Tarolli
ATTORNEYS

CAPILLARY INSULATION

This invention relates to insulating structures and, more particularly, to an improved insulation for use with low temperature liquids and a method of manufacturing same.

The handling and storing of low temperature liquids, such as liquid oxygen, have presented substantial problems. One particularly troublesome problem relates to the need for a suitable insulation which is relatively inexpensive but which is effective over long periods of time. There is disclosed in co-pending application Ser. No. 44,678, filed June 9, 1970 now U.S. Pat. No. 3,675,809, and assigned to the assignee of this invention, a new concept in insulation for handling and storing low temperature liquids, and which appears to offer a practical and effective solution to the insulation problem. As diclosed in that application, the insulation comprises a cellular material which provides a plurality of discrete cells in which a gas column is established between the container wall and the body of liquid. A capillary cover substantially closes the liquid side of each cell, the cover having at least one capillary opening per cell. The capillary openings are so designed that a stable capillary gas-liquid interface or membrane is formed at the capillary opening. These gas columns and their associated stable gas-liquid interfaces insulate the liquid from the container walls and, in addition, support the liquids in the container.

The capillary insulation disclosed in the aforementioned application is particularly well suited for insulating the walls of relatively large tanks in which the insulation can be fabricated in panels and applied to the walls of the tank. However, there are many environments other than bulk storage in tanks where insulation of low temperature liquids is required. One such environment is in the transferring of cryogenic liquid through suitable conduits which may either be rigid pipes or flexible tube. These pipes or tubes may be relatively long and are invariably associated with other fluid handling components such as elbows and tees or the like. Obviously, both the conduits and the components associated with the conduits must be suitably insulated to handle the cryogenic liquids. However, because of the variety of components used in different handling systems and the varying sizes and shapes of both the conduits and the components, providing a satisfactory insulation for the system has posed a substantial problem.

It is a primary object of this invention to provide capillary insulation of the type described which is particularly adapted for use in insulating both the conduit and other components in a fluid handling system.

It is a further object of this invention to provide a capillary insulation assembly which may be produced in a multiplicity of different configurations to conform to varying arcuate or shaped surfaces.

It is another object of this invention to provide an insulation assembly which is light weight in construction, but which is sufficiently rigid and strong that it alone may serve as a vessel for storing liquid, or as a conduit for transferring a liquid.

It is a still further object of the invention to provide a method of manufacturing a capillary insulation assembly in a seamless, circumferentially continuous configuration.

Still another object of the invention is to provide a seamless, circumferentially continuous capillary insulation which can be easily manufactured in varying sizes and thicknesses.

A still further object of the invention is to provide an insulation assembly which may be readily applied to either the exterior or the interior of a pipe.

Still another object of this invention is to provide a joint construction for interconnecting lengths of the capillary insulation.

In accordance with one broad aspect of the invention, an insulating assembly is provided which comprises a core defined by a plurality of parallel shaped pieces of flexible material with the peripheral edges of the assembled pieces cooperating to define shaped surfaces. Each of the pieces is adhesively secured to the pieces adjacent thereto at a plurality of angularly shaped points with the points of securement of each piece with the next adjacent piece on one side being offset from the points of securement with the next adjacent piece on the other side whereby expansion of said core by moving said pieces apart creates a plurality of discrete cells extending between the inner and outer shaped surfaces. A capillary cover is applied to one of the surfaces to enclose one end of the cells with the cover having capillary openings associated with each of the cells.

This basic structure readily lends itself to a variety of applications in which a curved or arcuate surface is to be insulated. For example, if it is desired to provide insulation around a pipe, the pieces may be in the form of rings which are so dimensioned that the inner diameter of the expanded core corresponds to the outer diameter of the pipe to be insulated. The capillary cover is then applied to the outer surface of the rings and the pipe to be insulated is inserted inside the core.

Conversely, if it is desired to insulate the wall of a pipe from a liquid flowing through the pipe, the same basic construction may be employed, except that the outer diameter of the expanded core is so selected that the assembly is insertable within the pipe. In this application, the capillary cover would be applied to the inner surface of the core so that the gas columns formed within the discrete cells would insulate the inner surface of the pipe from the liquid flowing through the pipe.

In addition to insulating pipes, it is apparent that the same basic insulation assembly could be used as a container or vessel for receiving low temperature liquid. Thus, with a capillary cover applied to the inner periphery of the core, and a suitable material, such as fiberglass, wrapped around the outer surface of the rings, a cylindrical tank or container is provided in which a low temperature liquid may be stored.

Still further, the same basic cylindrical construction is well adapted for use as a flexible hose or conduit through which a low temperature liquid may be transported. In this latter application of the insulative assembly, frequently it is necessary to connect one end of the insulative conduit to another conduit. To this end, there is provided a special insulating connector which is constructed in the same basic manner as the conduit, and which is adapted to be inserted in one end of the conduit. The connector includes liquid sealing means which is adapted to engage the conduit and prevent the flow of liquid through the joint formed therebetween.

The basic cylindrical insulation assembly lends itself to manufacturing techniques by which almost any diameter and length may be fabricated with either an exterior or interior capillary cover. The capillary cover may be applied to the interior surface of a cylindrical core by collapsing the core and inserting a mandrel carrying the cover through the collapsed rings. Thereafter, the core is expanded which, because of the geometry of the construction, causes the inner surface of the rings to shrink down onto the cover. In a similar manner, a cover is applied to the exterior of the core by applying the cover to the inner peripheral surface of a tube, stretching the core and inserting it in the tube and thereafter partially compressing the core along its center line to expand the outer surface of the core into engagement with the cover.

In the same manner, the core may be applied either to the interior or exterior of a tube. To fit the exterior of a tube, the core is compressed, slipped over the tube and stretched until it firmly engages the external surface of the tube. To fit internally of a tube, the core is stretched, inserted in the tube and partially compressed until the core has expanded to firmly engage the inner periphery of the tube.

A particular advantage of the cylindrical construction is that it eliminates the need for joints or splices except where lengths of the insulation are connected together. While panels of the type disclosed in the aforementioned application might be used to insulate a pipe by wrapping the panel around the pipe, it is apparent that a splice must be made where the two ends of the panel come together. This splice can adversely affect the insulative characteristics of the insulation. The circumferentially continuous or seamless construction obtainable with this invention eliminates such splices.

The foregoing objects, features and advantages of the invention, as well as others, will be more apparent upon a complete reading of the following description which, when taken with the attached drawings, discloses but a preferred form of the invention.

Referring now to the drawings wherein like reference numerals indicate like parts in the various views:

FIG. 1 is a perspective view, partially in section, of an insulation assembly constructed in accordance with the principles of this invention;

FIG. 2 is a perspective view of a pair of the rings from which the insulation assembly of FIG. 1 is constructed;

FIG. 3 is a perspective view of the expanded core;

FIG. 3A is a perspective view of the core of FIG. 3 in a contracted or collapsed position;

FIG. 4 is a sectional view along line 4—4 of FIG. 1;

FIG. 5 is a sectional view illustrating the manner in which the core is assembled over a mandrel;

FIG. 8 is a fragmentary view on an enlarged scale of a portion of FIG. 7.

Figure 6:
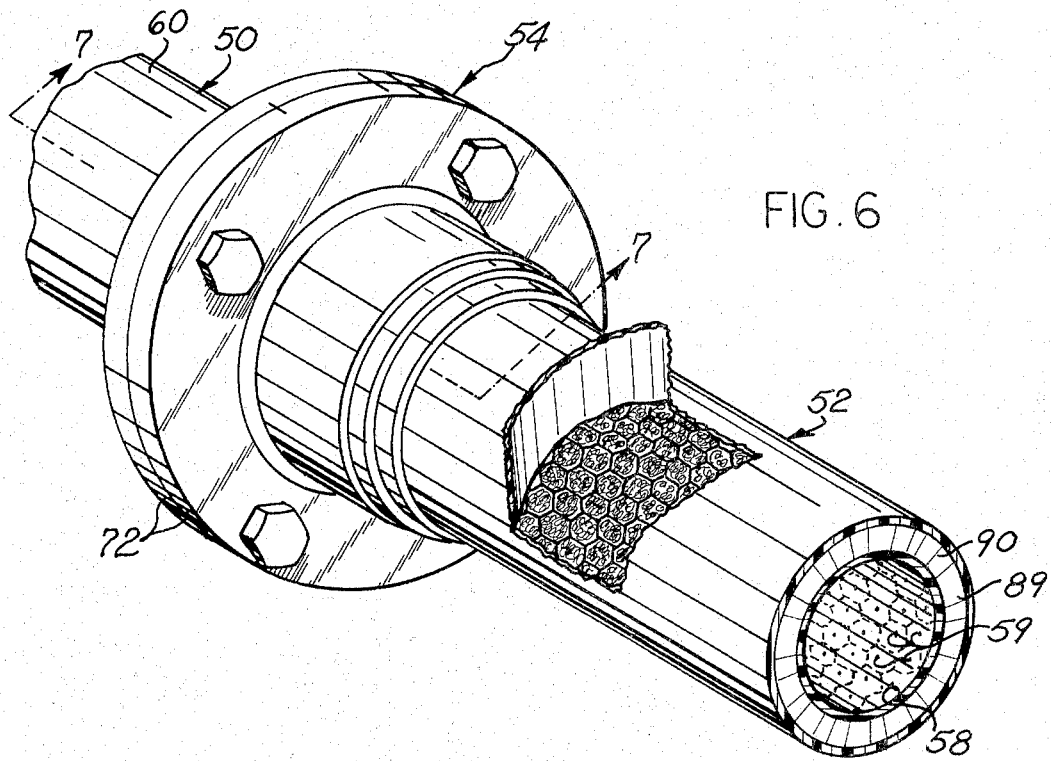
FIG. 6 is a perspective view in which the insulation assembly of FIG. 1 is used as a pair of conduits connected end-to-end.

Referring now more in detail to the drawings wherein the showings are for purposes of illustrating a preferred embodiment of the invention only, there is illustrated in FIG. 1 one form of a shaped insulation assembly, indicated generally by the reference numeral 10. This insulation assembly 10 comprises a cellular or honeycomb core structure 12, which defines a plurality of discrete contiguous cells 14. The cellular structure 12 defines a circumferentially continuous seamless cylindrical wall, with the cells 14 radiating outwardly from the center line of the cylindrical assembly. The inner peripheral surface 16 of the cellular structure 12 is covered by a capillary cover 18 while the outer peripheral surface 20 is enclosed by an appropriate cover sheet 22. Capillary openings 24, at least one per cell, are formed in the capillary cover 18.

Each of the cells 14 may be filled with a suitable insulative material 25, such as rock wool.

It is contemplated that the cellular structure 12 may be fabricated from low strength and low weight materials, such as Kraft paper or the like. The capillary cover 18 may be an equally low strength and weight material, such as a one mil Mylar film. The outer cover 22 may be polyester impregnated fiberglass which is bonded to the external surface 20.

The described insulation assembly 10 is particularly adapted for use as a hose, tube or conduit for transporting low temperature liquids. When so used, the low temperature liquid flows through the interior space defined by the cylindrical cellular structure, and as described in the aforementioned co-pending application, some of the liquid will pass through the openings 24 and vaporize in the cells 14 to form a gas column in each of the cells. After sufficient liquid has vaporized in the cells 14 to equalize the pressure of the gas columns with the pressure of the liquid in the conduit, a stable capillary gas-liquid interface or membrane is established with the low temperature liquid on one side of the membrane and an insulative gas column extending from the membrane outward to the outer cover 22 on the other side. This gas column serves as an insulating medium which insulates the cover 22 from the low temperature liquid flowing through the conduit. Moreover, these gas columns provide support for the liquid.

While the insulation assembly 10 has been illustrated in FIG. 1 as a cylindrical hose or tube, it is to be noted that the same basic insulation assembly can be used to insulate either the inner periphery or the outer periphery of a pipe. When used to insulate the inner periphery of the pipe, the assembly of FIG. 1 is dimensioned such that its outer diameter conforms to the inner diameter of the pipe to be insulated, and the assembly is then inserted in the pipe and bonded to the inner pipe wall. In such an application, the cover 22 may be removed so that the gas columns in the cells 14 would be in direct engagement with the pipe wall.

When insulating the external surface of a pipe, an arrangement similar to that shown in FIG. 1 would be employed, but the capillary cover 18 would be applied to the external surface 20 of the cellular core and the inner diameter of the cylinder would be dimensioned to correspond to the outer diameter of the pipe to be insulated. In this manner, low temperature liquid external to the pipe would be insulated from the pipe by the gas columns formed in the cells 14 and which would extend from the external capillary cover radially inward to the external surface of the pipe.

The cylindrical insulation assembly 10 of FIG. 1 may be constructed in a seamless circumferentially continuous manner so that both longitudinal and radial joints or splices are eliminated. This is accomplished by constructing the cellular structure or core from a plurality of individual flat annular rings, such as those shown in FIG. 2. Only two rings 30,32 are illustrated in that Figure, but it will be appreciated that any number of rings may be employed, depending on the particular length desired for the insulation assembly. The rings 30,32 are cut from a flexible material such as the aforementioned Kraft paper. Adhesive 33 is then applied to angularly spaced areas on one side of each of the rings, with the adhesive means extending radially from the inner surface to the outer surface of each ring. The angular spacing of the adhesive means is preferably the same on all rings.

The rings are then stacked one on top of the other with every other ring being angularly rotated a certain amount, as, for example, 45°, so that the adhesive areas on adjacent rings are angularly offset. The stacked rings are then pressed together so that the adhesive areas bond adjacent rings together. This stacked and bonded relationship of the rings is illustrated in FIG. 3A, where it is to be noted that the peripheral inner and outer edges of the stacked rings cooperate to define the desired cylindrical surfaces 16,20.

By moving the two end rings in opposite directions, the stacked rings of FIG. 3A are expanded to form the core configuration of FIG. 3. This core comprises the basic cellular structure 12 from which the insulation assembly 10 of FIG. 1 is constructed. It is apparent from FIG. 3 that the cells 14 are defined by cooperating portions of adjacent rings with each ring, because of the longitudinal expansion of the core, being deformed to an undulating or wave form cross-sectional configuration.

Because of this geometric configuration, the core has a variable inner and outer diameter. As the core is compressed or collapsed longitudinally, the inner and outer diameters are increased up to a maximum diameter corresponding to the basic rings 30,32, from which the core is constructed. Conversely, as the core is expanded longitudinally, the inner and outer diameters decrease. This characteristic of a variable diameter may be used to advantage either in constructing a hose or tube, such as that shown in FIG. 1, or in assembling the core to a pipe or tube.

Referring to FIG. 5, there is illustrated one method by which the insulation assembly of FIG. 1 may be constructed. As illustrated, an elongated inflatable mandrel 40 having a pair of detachable end caps 42, 44 is provided. An inflatable bladder 46 extends around the outer periphery of the mandrel and radial apertures 48 communicate the interior of the bladder with the interior 47 of the mandrel tube. A source of fluid pressure, not shown, is constructed through an opening 49 in the cap 44, with the interior of the tube.

The mandrel is used in the following manner: A core, such as that shown in FIG. 3, is assembled. Mylar film corresponding to the capillary cover 18 is then laid over the bladder 46. Adhesive is applied to the interior surface 16 of the core and the core is telescopically assembled over the mandrel tube. In assembling the core over the mandrel, the core is first compressed thereby to increase its inner diameter so that the mandrel tube may be freely assembled inside the core. The compressed core as assembled over the mandrel is illustrated by the dotted-line portion in FIG. 5.

With the compressed core assembled over the mandrel and the caps 42, 44 attached, the core is then expanded longitudinally which causes the core to shrink in diameter so that the inner surface 16 of the core firmly engages the Mylar film. The adhesive is cured which bonds the film to the cellular structure. Air pressure is then introduced through the aperture 49 and the radial apertures 48 to expand the bladder 46. As the bladder expands, it protrudes, to a small extent, into each of the cells 14, carrying with it the Mylar film to form film dimples. The pressure is maintained in the bladder 46 while the film is warmed and cooled which permanently sets the film dimples. The resultant assembly has the capillary cover bonded to the internal periphery of the core, with the cover material over each cell being generally concave in configuration. The assembly is then removed from the mandrel and heated needles may be used to pierce each of the holes 24 in the capillary cover. Thereafter, the cells 14 are filled with the rock wool material and, depending on the particular application, a cover 22 may be applied over the external surface of the core. The advantages of the cell filler and the dimpling of the capillary cover are set forth in copending applications Ser. No. 44,678 filed June 9, 1970 now U.S. Pat. No. 3,675,809 and Ser. No. 81,400 respectively, and to that extent those disclosures are incorporated herein by reference.

A similar modified technique may be employed for assembling the capillary cover to the external periphery of the core. In this modified technique, the core is stretched out to reduce the outside diameter of the core, and a mandrel is then assembled over the stretched core. Thereafter, the core is compressed to expand the outer periphery into engagement with the Mylar film. Fluid pressure is then applied to an expandable bladder which expands inwardly of the mandrel toward the core to produce the concave configuration of the capillary cover over each of the cells. The finished assembly is the same as that illustrated in FIG. 1 except that the capillary cover extends around the outer periphery of the cellular structure.

The same technique of longitudinally expanding or contracting the core to vary its diameter can be usefully applied in assembling the core to a pipe or tube. For example, if it is desirable to insulate the outer surface of a pipe, a core, such as that illustrated in FIG. 3, may be compressed to expand its internal diameter and then telescopically assembled over the pipe. Thereafter the core is longitudinally expanded to shrink the core down onto the surface of the pipe. The cells may then be filled with rock wool and the capillary cover applied to the outer surface of the core. In a similar manner, the core may be assembled to the inner periphery of a pipe by stretching the core to reduce its outer diameter and telescopically assembling the pipe over the stretched core. Thereafter the core is compressed to expand the outer diameter until the outer surface of the core is in engagement with the inner periphery of the pipe.

Figure 7:
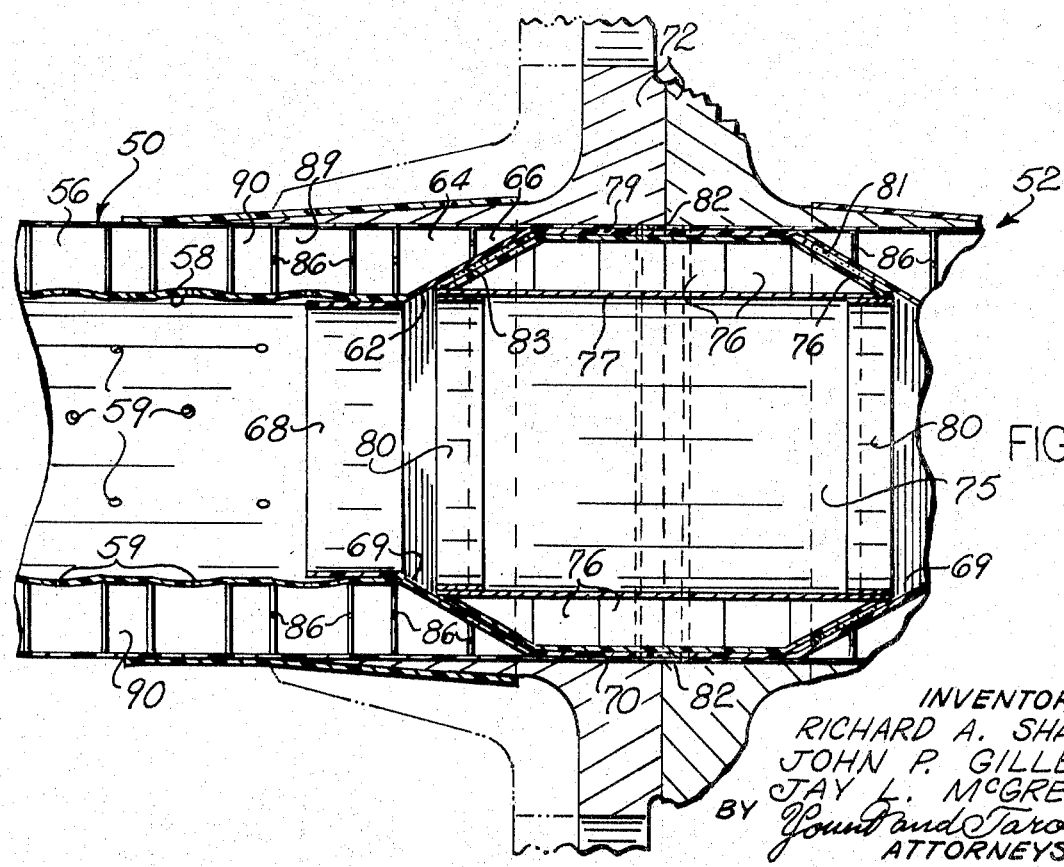
FIG. 7 is a sectional view along line 7—7 of FIG. 6 and illustrates the joint connection between the two conduits.

Referring now to FIGS. 6 and 7, there is illustrated one specific application of the cylindrical insulation assembly 10. As shown in FIG. 6, the insulation assembly has been constructed in the form of a pair of hoses or conduits 50,52 which are joined end-to-end by a suitable joint connection, indicated generally by the reference numeral 54. Each of the tubes 50,52 is constructed in the same manner, which is basically that illustrated in FIG. 1. Thus, each tube comprises a cylindrical cellular core 56 defining a plurality of radially extending cells with a capillary cover 58 having capillary openings 59 extending around the inner periphery of the core. A suitable external covering, such as fiberglass roving 60, extends around and encloses the outer periphery of the cellular structure.

The end of each tube is modified to define a radially outwardly opening frusto-conical mouth 62. The tapered or inclined wall defining the mouth 62 has radially extending cells, such as those shown at 64,66, but the Mylar film comprising the cover sheet 58 terminates at the axially inner end of the mouth, thereby leaving the radially inner end of the cells open. The cover sheet 60 extends axially over and encloses the outer end of the cells 64,66. To enclose the inner end of the cells 64,66, there is provided a specially shaped fiberglass collar, which comprises a generally cylindrical portion 68 adapted to be received within the core, and an integral radially outwardly flaring portion 69 which, at its axially outer end, terminates in a cylindrical portion 70. The collar is bonded to the core with the cover 60 extending axially beyond the end of the core over the cylindrical portion 70. A metal flange 72 is received over the end of the conduit and secured thereto by suitable adhesive and fiberglass cloth wrapped around the flange.

Although only the one end of the tube 50 has been described, it will be appreciated that the adjacent end of the tube 52 is identical in construction, and the foregoing description applies to that tube as well.

Adapted to be received between the adjacent ends of the two tubes 50,52 is a special connector, indicated generally by the reference numeral 75. This connector comprises a cylindrical cellular structure 76 which is substantially identical in its basic construction to the tubes 50,52. The cellular structure defines a plurality of radially extending cells with a capillary cover 77 having capillary openings formed therein extending around the inner periphery of the cellular structure. An external cover of fiberglass roving encloses the radially outer ends, of the cells. The opposite ends of the connector 75 have axially extending, radially inwardly tapering surfaces 78 which conform to and are adapted to mate with the mouth 62 on the end of each of the tubes 50,52. It will be noted from FIG. 8 that the tapered surfaces 78 which define a cross-sectional configuration of the cellular structure is in the form of an isosceles trapezoid.

A cover 79 extends over the tapered surfaces 78 and a strip of fiberglass cloth 80 is applied to the inner periphery of the connector 75 to provide additional strength.

Liquid seal means in the form of circumferentially extending cork strips 81, 82, 83 are secured to the outer periphery of the cover 79. The circumferential strips 81,83 are adapted to engage the surface of the tapered collar 69 in the mouth 62 of the tubes while the cork strip 82 is adapted to provide a liquid seal at the joint between the two metallic flanges 72, as best seen in FIG. 8.

It will be appreciated that the connector 75 and its associated cells thus provides the same capillary insulation as the tubes 50,52, so that the integrity of the system is not adversely affected by the joint connection 54. In particular, it is to be noted that at each point along the tubes and the connector, cells extend radially outward to provide the desired insulation. However, because of the conical mouth constructions on the ends of the tubes 50,52 and the mating surfaces formed on the connector 75, special provision is required to maintain the necessary gas columns in the cells at those areas. More particularly, it will be observed that with respect to the mouth 62 of the tube 50, the cover 58 terminates axially inward of the cells 64, 66. Moreover, the radially inner end of the cells 64, 66 are covered by the tapered portion 69 on the collar inserted in the end of the tube. As a result, these cells are isolated from the low temperature liquid flowing through the conduit so that the desired stable capillary gas-liquid interface and its attendant gas column cannot be established in these cells in the manner previously described. To assure the presence of an insulative gas column in cells 64, 66, each of these cells is interconnected by suitable apertures 86 in the cell walls to the adjacent cells in which the gas liquid interface is present. As shown in FIG. 8, this requires an opening in the cell walls common to the cells 64, 66, 88, 89 and 90. In this manner, the gas column established in the cell 90 is diffused through the openings 86 into the adjacent cells so that the insulative gas column is established in these cells as well. In the same manner, the cells, the inner ends of which are overlapped by the fiberglass strip 80 in the connector 75, are communicated by suitable apertures 91 with the next adjacent cells to provide a gas column in these cells.

It will thus be noted that the connector cooperates with the mouth of each of the tubes 50, 52 to provide an insulated connection that has a thermal conductivity which approaches that of the gas columns in the cells. The cork strips 81, 82, 83 have a degree of porosity and prevent any leakage of the low temperature liquid between the abutting surfaces and provide gas pockets therebetween. Both the radially inner as well as the radially outer surfaces adjacent to the seals 81, 83 are insulated by the gas columns in the adjacent cells.

It will be appreciated from the foregoing that the described basic insulation assembly readily lends itself to a wide variety of applications. It may be used primarily as insulation in combination with a pipe or tube through which a low temperature liquid is to be transported, or it may be used by itself as the conduit through which the liquid is transported. Moreover, while the disclosed insulation assembly has been described primarily in connection with the transfer of liquids through pipes or tubes, the same basic construction can be employed for storing liquids. For example, the same basic construction as illustrated in FIG. 1 might be used as a cylindrical container, vessel or tank in which a low temperature liquid is to be stored, with the outer cover 22 corresponding to the container or tank wall. Moreover, while only cylindrical configurations have been specifically illustrated, it is to be appreciated that other arcuate or nonplanar shapes could be made using the same basic techniques and construction. For example, the rings illustrated in FIG. 2 might be made with a wide variety of noncircular inner and outer peripheries, depending on the particular application.

Alterations and modifications in the described invention will suggest themselves to those having ordinary skill in the art so that while a preferred embodiment of the invention has been disclosed, it is not intended that either the illustrated embodiment or the terminology employed in describing it is to be limiting; rather, it is intended to be limited only by the scope of the appended claims.

What is claimed is:

1. An insulation assembly for providing insulation for a low temperature boiling point liquid, said insulation assembly comprising, a series of rings of flexible material each having a central opening therethrough and being arranged in a coaxial arrangement, means securing each of said rings to the rings adjacent thereto at a plurality of spaced apart points with the points of securement of each ring with the next adjacent ring on one side thereof being offset from the points of securement with the next adjacent ring on the other side thereof, whereby expansion of said assembly of rings by moving said rings axially apart creates a plurality of discrete cells extending radially of the axes of the rings, said rings when moved axially defining a central chamber for said liquid with the inner ends of said cells communicating with said chamber, and means for providing a stabilized capillary gas-liquid interface closing the inner ends of the cells communicating with said central chamber, said means for providing the stabilized capillary gas-liquid interface including a cover means extending over the inner ends of said cells and having capillary openings formed therein in communication with at least a substantial portion of said cells, said assembly being supported interiorly of a circular outer cover having wall means defining an outer surface closing the outer ends of the cells.

2. An insulation assembly as defined in claim 1 wherein said assembly is supported interiorly of a circular outer cover having wall means defining an outer surface and an interior space through which said liquid flows and means supporting said assembly on said wall means so that the fluid flows through said central chamber and is insulated from said wall means.

3. The conduit of claim 2 wherein said outer cover comprises a rigid pipe.

4. The insulated conduit of claim 2 wherein said outer cover comprises a flexible material.

5. The insulated conduit of claim 2 wherein said wall means further includes at one end thereof an axially extending circumferential surface inclined at an angle to the longitudinal axis of said wall means.

6. The insulated conduit of claim 5 wherein said cover means sealingly closes the ends of at least some of the cells radiating from said inclined surface and said wall means includes opening means intercommunicating at least some of said cells radiating from said inclined surface with other of said cells axially spaced along said conduit.

7. The insulated conduit of claim 5 wherein said inclined surface is formed on the inner peripheral surface of said wall means and defines a generally frusto-conical mouth at the end of said wall means.

8. The insulated conduit of claim 7 and further including a second elongated conduit of substantially the same construction as said first mentioned conduit;

said second conduit being spaced from but coaxial with said first conduit with said frusto-conical mouth on one conduit opening toward the frusto-conical mouth on the other conduit, insulating connector means extending between said two conduits, said insulating connector means including portions thereof in sealing engagement with said frusto-conical mouth on the ends of both of said conduits.

9. The conduit of claim 8 wherein said connector comprises a circumferentially continuous wall means defining an interior space through which liquid may flow, said wall means including a plurality of contiguous radially extending cells throughout the length thereof, an inclined surface formed on the outer peripheral surface of said connector at either end thereof with the inclined surfaces on said connector being adapted to mate with the inclined surfaces on said frusto-conical mouths of said conduits, cover means extending around the inner periphery of said conduit and enclosing the radially inner ends of said cells, capillary openings formed in said cover means and communicating at least the predominant portion of said cells with the interior of said connector, an outer connector cover extending around said connector and enclosing the radially outer end of said cells, and seal means on said inclined surfaces of said connector for establishing a liquid seal at the joints between said connector and said conduits.

10. The conduit of claim 9 and further including radially extending flanges on the ends of said conduits, means for securing said flanges together, and seal means on said connector cooperating with said flanges to seal the joint between said flanges.

11. The insulated conduit of claim 5 wherein said inclined surface is formed on the outer peripheral surface of said wall means.

12. The insulated conduit of claim 11 and further including sealing means carried on said inclined surface.

13. The insulated conduit of claim 11 wherein said conduit has an inclined surface at either end thereof whereby said wall means is generally trapezoidal in longitudinal cross-sectional configuration.

* * * * *